United States Patent [19]

Kloppsteck

[11] Patent Number: 5,557,826
[45] Date of Patent: Sep. 24, 1996

[54] HEAT INSULATING HANDLE FOR METALLIC COOKING POTS AND THE LIKE

[75] Inventor: Gerd Kloppsteck, Arnsberg, Germany

[73] Assignee: Heinrich Berndes Produktionsgesellschaft mbH, Germany

[21] Appl. No.: 545,831
[22] PCT Filed: Mar. 20, 1995
[86] PCT No.: PCT/EP95/01034
§ 371 Date: Nov. 8, 1995
§ 102(e) Date: Nov. 8, 1995
[87] PCT Pub. No.: WO95/25458
PCT Pub. Date: Sep. 28, 1995

[30] Foreign Application Priority Data

Mar. 24, 1994 [DE] Germany .............. 9405011 U

[51] Int. Cl.⁶ .................................................. A47J 45/08
[52] U.S. Cl. ................... 16/166 R; 16/110 A; 16/114 A; 220/759
[58] Field of Search ............... 16/116 R, 110 A, 16/114 A, 110 R; 220/759, 753, 769

[56] References Cited

U.S. PATENT DOCUMENTS

| | | | |
|---|---|---|---|
| 1,153,575 | 9/1915 | Rowley | 16/116 R |
| 2,172,524 | 9/1939 | Stevens | 16/116 R |
| 3,616,964 | 11/1971 | Yamazaki | 220/759 |
| 3,661,296 | 5/1972 | Hamer | 220/753 |
| 3,774,263 | 11/1973 | Day et al. | 16/110 A |
| 4,032,032 | 6/1977 | Carroll et al. | 16/110 A |

FOREIGN PATENT DOCUMENTS

| | | |
|---|---|---|
| 1264711 | 3/1968 | Germany . |
| 2137416 | 2/1973 | Germany . |
| 4206685 | 3/1994 | Germany . |

*Primary Examiner*—Chuck Y. Mah
*Attorney, Agent, or Firm*—Dvorak and Traub

[57] ABSTRACT

Handle of heat insulating material comprising a handle strap or a handle plate (12) and an integrally attached fastening body (16) for cooking pots, braising pots, frying pans and like pot or bath-shaped metallic kitchenware which have a respective projection provided with a threaded bore on the external surface of their wall in the region of the handle (10) to be fastened. The fastening body (16), which has an engagement surface (18) in the fastening region shaped complementarily to the outer wall of the kitchenware and is provided with a recess (24) for receiving the projection, is placeable on the projection and is securable by means of a fastening screw screwed into the threaded bore through a bore (26) in the fastening body (16). The bore (26) in the fastening body of the handle (10) has a recess for the head of the fastening screw in which the head of the fastening screw is recessed in the predetermined fastened position. Provided in the region of the recess (28) of the bore (26) in the fastening body (16) is a cover which closes the mouth of the recess and which is constituted, for instance, by a strap which is inserted into a horizontal groove (30) of small depth extending over the breadth of the fastening body.

9 Claims, 2 Drawing Sheets

| # HEAT INSULATING HANDLE FOR METALLIC COOKING POTS AND THE LIKE

BACKGROUND OF THE INVENTION

The invention relates to a handle of heat insulating material, comprising a handle strap or a handle plate and an integrally attached fastening body, for cooking pots, braising pots, frying pans and like pot or bath-shaped metallic kitchenware which, in the region of the handle to be fastened, on the external surface of their wall have a respective projection, which is provided with a threaded bore and on which the fastening body, which in the fastening region has an engagement surface shaped complementarily to the outer wall and is provided with a recess for receiving the projection, may be placed and may be secured by means of a fastening screw screwed through a bore in the fastening body into the fastening bore, whereby the bore in the fastening body of the handle has a recess for the head of the fastening screw in which the head of the fastening screw is recessed in the predetermined fastened position.

The fastening of heat insulating handles—preferably manufactured from plastic material—to metallic pots, friers, pans and the like is effected in many cases so that a fastening projection is rivetted, welded or soldered onto the outer surface of the pot in the fastening region of the handles, which projection is provided with a threaded bore into which the threaded shaft of a fastening screw passed through a fastening bore in the handle may be screwed as in French Patent Application No. 2,683,136. The fastening bore is provided with an external recess in which the head of the fastening screw is recessed in the predetermined fastened position. This prevents the head of the fastening screw, which has an increased temperature due to thermal conduction during the cooking process from the pot wall via the projection and the threaded shaft, being able to be inadvertently contacted by the user which could lead not only to a burn but—due to the shock—also to dropping the pot. This inherently simple and proven method of fastening is, however, not necessarily aesthetically pleasing—at least with metal pots of the higher price ranges, particularly as the head, which is generally metallic and glossy, of the fastening screw is also still visible in the recess. The recess for its part also constitutes a site for the accumulation of dirt or washing residues and may itself only be maintained clean with difficulty.

SUMMARY OF INVENTION

Against this background, it is the object of the invention to provide a heat insulating handle for metallic cooking pots and the like which is simply and economically installable and removable in the same manner but does not have the described disadvantages of the known handles and furthermore also has an optically attractive appearance which may also be altered, if required.

Starting from a handle of the type referred to above, this object is solved in accordance with the invention if provided in the region of the recess of the bore in the fastening body there is a cover closing the mouth of the recess. In the simplest case, this cover can be constituted by a low stopper or a closure disc fitted into the recess which then prevents the penetration of dirt into the recess. As a result of the colour of the cover differing from the colour of the actual handle, an additional aesthetically attractive effect can also be achieved.

In a further preferred embodiment of the invention the construction is such that a horizontal groove of small depth is provided which extends over the mouth of the recess and extends over the breadth of the fastening body and into which the strip-shaped cover, whose breadth corresponds to the breadth of the groove, is inserted. Particularly if such a strip-shaped cover is painted with a signal paint contrasting with the colour of the handle, this divides the handle in a delightful manner and provides an attractive appearance. On the other hand, the cover can of course be matched to the colour and surface structure of the handle so that after insertion into the groove it completely disappears optically. The manner of the fastening of the handle to the pot is then no longer readily detectable.

The groove can extend over the entire breadth and additionally the lateral boundary surfaces of the fastening body to the engagement surface, whereby the strip-shaped cover then has the shape of a U form strap corresponding to the shape of the groove which is pushed into the groove from the front.

The strip-shaped cover preferably has a thickness corresponding to the depth of the groove, whereby its visible external surface merges into the external surface of the handle without a step or depression and the production of steps or projections or even recesses in which dirt could be accumulated is prevented. Alternatively, a different construction of the cover is of course also possible such that it has a projecting profile shape on the external surface.

Conveniently provided in the ends of the groove on the engagement surface side is a respective recess into which projections provided at the ends of the U-shaped straps are locked. It is recommended that the recesses in the ends of the groove at the engagement surface side extend over the entire breadth of the groove and that a locking surface be constructed at their edge remote from the pot which extends approximately perpendicularly to the base of the groove and is directed towards the pot to be provided with the handle and the projections provided at the ends of the U-shaped strap be provided with a respective complementary locking surface pointing away from the free end of the strap. In the predetermined fastened position of the U-shaped strap in the groove, it is then ensured that the U-shaped strap cannot inadvertently come free. Only if the ends of the strap are deliberately bent up, which is only possible with a special hook-shaped tool if the strap is precisely fitted into the groove, is removal possible which can, however, then proceed very simply and rapidly.

In order to facilitate installation, the locking projections on the ends of the U-shaped strap can be defined at their sides directed towards the free ends of the strap by obliquely inclined ramp surfaces which simplify the sliding of the free ends of the strap into the lateral groove sections. The free distance between the limb sections of the U-shaped strap inserted into the sections of the groove provided in the lateral boundary surfaces of the fastening body, in the uninstalled state, is preferably somewhat smaller than the distance measured above the base of the lateral groove sections, whereby the limb sections are necessarily elastically bent up, when installed. The projections provided at the ends of the strap are thus held in the associated recesses under an elastic biassing force.

In order to secure the U-shaped strap against displacement in the longitudinal direction of the groove, a projection can project into the mouth of the recess in the fastening body from the side directed towards the base of the groove of the web section of the U-shaped strap, whereby this projection is then conveniently complementarily shaped to correspond to the mouth of the recess.

BRIEF DESCRIPTION OF THE DRAWINGS

The invention will be explained in more detail in the following description of an exemplary embodiment in conjunction with the drawings, in which.

DETAILED DESCRIPTION OF THE INVENTION

Figure 1:
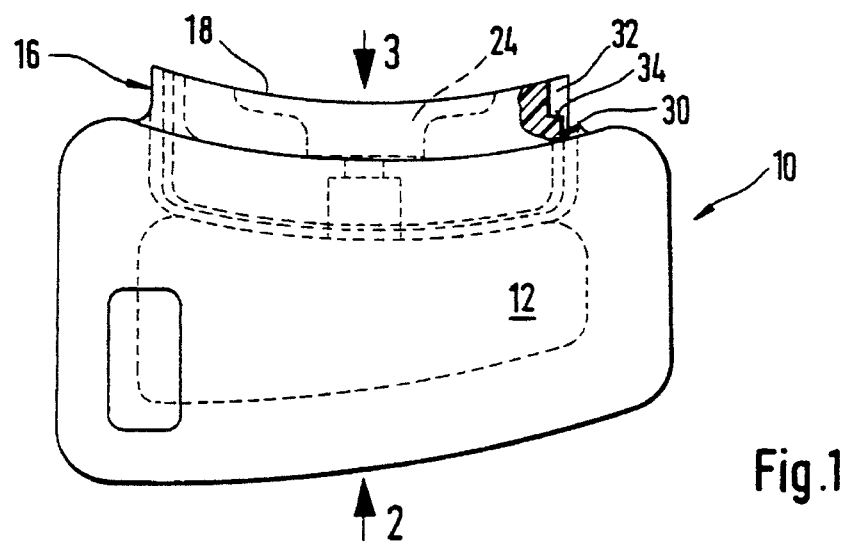
FIG. 1 is a plan view of a handle constructed in accordance with the invention.
Figure 2:
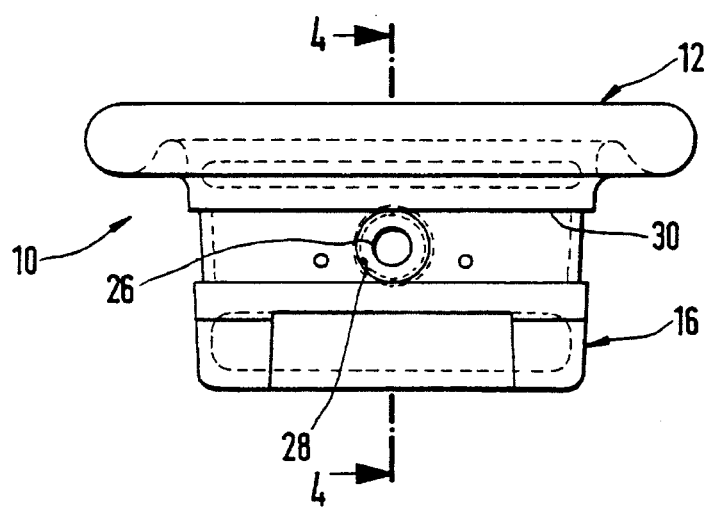
FIG. 2 is a front view of the handle, seen in the direction of the arrow 2 in FIG. 1, without the cover concealing the recess for the fastening screw.
Figure 3:
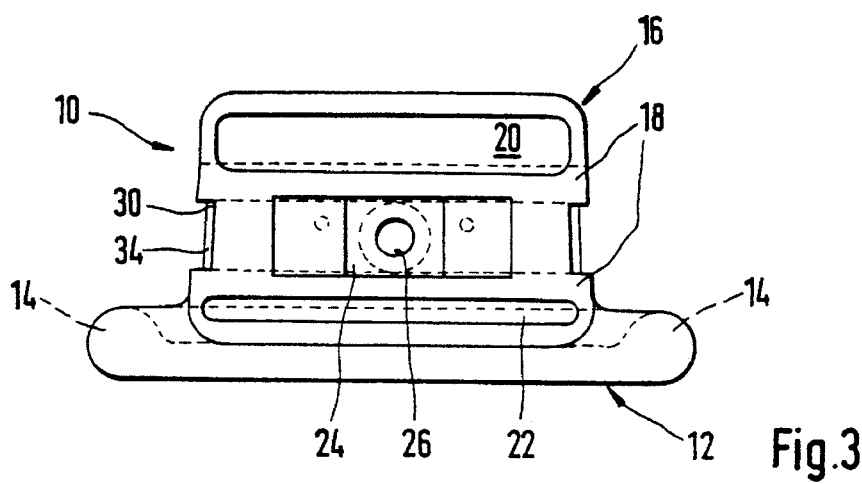
FIG. 3 is a rear view of the handle, seen in the direction of the arrow 3 in FIG. 1.
Figure 4:
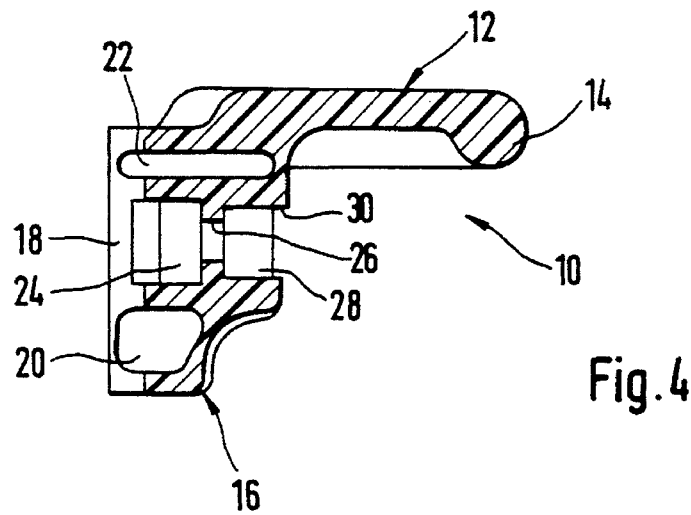
FIG. 4 is a sectional view, seen in the direction of the arrows 4—4 in FIG. 2.

The handle in accordance with the invention, which is shown in FIGS. 1 to 4 and is designated as a whole with 10, is a side handle of the type which are fastened—in pairs and diametrically opposed—to the outer surface of the pot wall of cooking pots manufactured from e.g. corrosion-resistant steel. The handle, which is manufactured from a suitable heat-resistant—preferably duroplastic—plastic material and which thus is not heated up or only to a small extent by the heat transmitted during the cooking process into the wall of the cooking pot, is composed in the illustrated case of a handle plate 12 with a torroidally thickened edge 14 and—below the handle plate—an integrally attached fastening body 16, the engagement surface 18 of which directed towards the pot is shaped complementarily to the fastening region of the wall of the cooking pot. The fastening body 16 is not massively constructed in this particular case from the plastics material which is used but instead—in order to save weight and material—has open recesses 20 and 22 directed towards the wall of the cooking pot. Provided in the region between the recesses 20 and 22 is a further specially shaped recess 24 whose shape complementarily corresponds to a projection (not shown) provided in the fastening region on the outer wall of the cooking pot.

In the case of the handle 10, the recess 24 in the fastening body 16 is so shaped that a projection, which is used on the pot with known handle fastening arrangements also, in the form of a strap bent from flat metallic material is fittingly received. The strap is unreleasably connected to the pot wall, e.g. by welding or soldering, at its two ends which engage the pot wall and in the intermediate web region remote from the pot wall has an impressed bush in which a threaded bore is positioned. Provided in the fastening body 16 in the region aligned with the threaded bore in the fastening strap in the predetermined fastened position of the handle 10 to the pot wall is a bore 26 which permits the threaded shaft of a fastening screw (not shown) to be passed through and screwed into the threaded bore in the fastening strap. The bore 26 opens out at its end remote from the pot in a recess 28 for the head of the aforementioned fastening screw which is thus completely received within the recess 28 in the predetermined fastened position so that the danger of contacting the head of this fastening screw, which extends beyond the threaded shaft and the fastening strap in metallic contact with the pot, by the user gripping the handle 10 of the cooking pot is reliably avoided.

Extending transversely above the recess 28 within the fastening body 16 is a horizontal groove 30 of relatively small depth which extends over the entire breadth and the side boundary surfaces of the fastening body 16 to its engagement surface 18. The breadth of the groove is approximately the same as the diameter of the recess 28 or only slightly greater. In the end regions on the engagement surface side the groove 30 is provided with a respective recess 32, one of which may be seen in FIG. 1 in the broken away and sectioned region in the upper, right-hand corner region of the fastening body 16. It may be seen that the recesses 32 in the transition region with the groove 30 of reduced depth constitute a respective locking surface 34.

Figure 5:
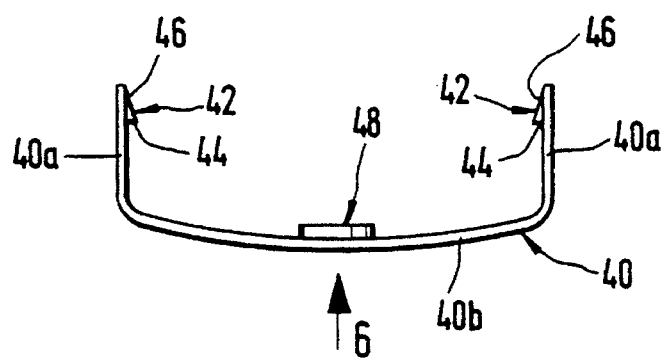
FIG. 5 is a plan view of the cover, constructed as a U-shaped strap, for the recess of the fastening bore in the handle.
Figure 6:
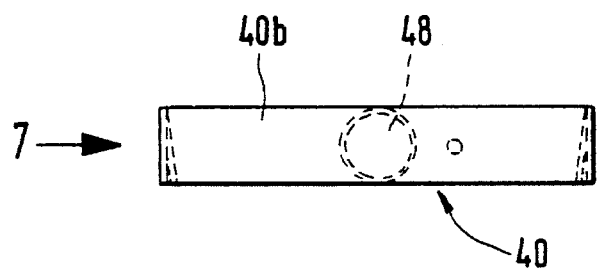
FIG. 6 is an elevation of the U-shaped strap, seen in the direction of the arrow 6 in FIG. 5.
Figure 7:
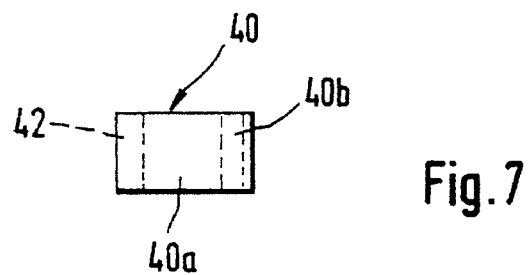
FIG. 7 is an elevation of the U-shaped strap, seen in the direction of the arrow 7 in FIG. 6.

Inserted into the groove 30, after fastening the handle 10 to the pot by means of the aforementioned fastening screw, is a cover in the form of the U-shaped strap 40 shown in FIGS. 5 to 7 whose thickness and dimensions are such that, after installation, it fills the groove and merges flush into the boundary walls of the fastening body 16. Depending on whether the strap 40 is manufactured from a material which corresponds in its surface structure and colour to the material of the handle 10 or from a material which differs from this handle material in its surface structure and colour, the strap 40 is practically invisible after installation or acts as a deliberately provided, optically attractive strip-shaped decorative element. At the inner sides directed towards the recesses 32, the end sections of the lateral limbs 40a of the strap 40 have projections 42 which, when the strap 40 is introduced into the groove 30, lock into the respective associated recess 32. Formed on the projections 42 at the ends remote from the ends of the limbs 40a are locking surfaces 44 which engage the locking surfaces 34 of the recesses 32, in the predetermined fastened position of the strap 40 in the groove 30, and thus prevent withdrawal of the strap from the groove if the ends of the limbs 40a are not bent up so far that the locking surfaces 44 come free of the locking surfaces 34.

In order to facilitate the installation of the strap 40 in the groove 30, ramp surfaces 46 inclined obliquely to the free ends of the strap are provided on the projections 42. In the uninstalled initial condition, the free spacing between the lateral limb sections 40a of the strap 40 is somewhat smaller than the distance between the base of the groove 30 in the region of the side surfaces of the fastening body so that the limb sections 40a are spread elastically when the strap is installed and are then also under a certain biassing force when the projections 42 are locked in the recesses 32.

It may be seen in FIGS. 5 and 6 that projecting centrally from the side, directed towards the base of the groove 30, of the web section 40b, connecting the outer limb sections 40a, of the U-shaped strap 40 is a low projection 48 which, in the illustrated case, has the shape of a low cylindrical plug, the external diameter of which is substantially the same as the diameter of the mouth region of the recess 28 in the fastening body 16. In the predetermined fastened position, the spring 48 thus engages fittingly in the recess 28 and thus additionally secures the strap against lateral displacement in the groove 30.

It will be apparent that modifications and further developments of the described exemplary embodiment of the handle 10 in accordance with the invention may be realised within the scope of the inventive concept. Such modifications can relate, for instance, to the length and depth of the groove 30. Thus it is absolutely possible that the groove extends only over the front side of the fastening body directed towards the viewer, that is to say does not extend to the engagement surface 18 in the side surfaces. An even shorter length such that it extends only over a portion of the breadth of the fastening body is also possible. The strap 40 is then shortened appropriately and has practically only the shape of a thin plate, which is then conveniently held in the recess by means of the stopper-like projection 48, which is slightly over-sized with respect to the diameter of the recess, whereby alternatively or additionally other locking means are also possible. Instead of the construction of the strap such that it merges flush and so to speak steplessly into the wall of the fastening body 16, the strap can also be deliberately so profiled on its outer surface that it projects beyond or is set back with respect to the wall of the fastening body, if this is desirable for optically aesthetic reasons. Such projecting or set back profiles should, however, be rounded, having regard to as simple as possible cleaning, and be constructed to be easily accessible for cleaning devices.

I claim:

1. Handle apparatus of heat-insulating material for attachment to a cooking vessel having a fastening projection with a threaded bore therein located on an external wall of the cooking vessel, the handle apparatus comprising a handle portion and an integrally attached fastening portion, the fastening portion having an engagement surface shaped complementarily to the outer wall of a cooking vessel, and a lateral surface which remains exposed when the handle apparatus is secured to a cooking vessel, the fastening portion having a recess for receiving the fastening projection of a cooking vessel, and a handle portion bore for receiving a fastening screw therethrough for securing the handle apparatus to the fastening projection of a cooking vessel by way of a threaded bore located in the fastening projection, the handle portion bore leading out to a countersunk recess formed in the handle portion for receiving the head of a fastening screw, said handle apparatus further comprising a horizontal groove of relatively small depth, the groove being defined by a base and perpendicular side walls, which groove extends over the mouth of the countersunk recess and over the breadth of the lateral surface of the fastening portion for receiving a cover, which cover is fashioned as a strip shape to correspondingly reside within the groove and which thereby closes the mouth of the countersink recess.

2. Handle apparatus as claimed in claim 1 wherein the strip-shaped cover has a thickness corresponding to the depth of the groove.

3. Handle apparatus as claimed in claim 1, wherein the lateral surface of the handle portion is generally U-shaped, having a central web section and two limb sections extending from either end thereof, and the groove extends over the entire breadth of the lateral surface and that the strip-shaped cover has the shape of a U-shaped strap corresponding to the shape of the groove, the U-shaped strap being formed of a central web section and two limb sections extending from either end thereof, the limb sections of the strip residing in the limb sections of the groove.

4. Handle apparatus as claimed in claim 3 wherein provided in each of two ends of the groove adjacent the engagement surface side are respective recesses in which projections are retainingly received, which projections are provided at the ends of the U-shaped strap.

5. Handle apparatus as claimed in claim 4, wherein the recesses in the ends of the groove extend over the entire breadth of the groove and, each recess has at its edge remote from the cooking vessel when in an installed position, a locking surface which extends approximately perpendicularly to the base of the groove and is directed towards the cooking vessel when in an installed position and wherein the projections provided at the ends of the U-shaped strap are provided with a respective complementary locking surface directed away from free ends of the limb sections of the strap, and towards the web section thereof.

6. Handle apparatus as claimed in claim 5, wherein the locking projections at the ends of the U-shaped strap are each bounded at their sides pointing towards the free strap end by an obliquely inclined ramp surface.

7. Handle apparatus as claimed in claim 3, wherein a free distance between the two limb sections of the U-shaped strap, when in an uninstalled position, is slightly smaller than a distance measured between the base of the two limb sections of the groove to thereby require an elastic expansion of the limb sections of the strap in order to effect installation of the U-shaped strap.

8. Handle apparatus as claimed in claim 3, wherein a projection projects into the mouth of the countersink recess in the fastening portion from a side remote from the groove base of a web section of the U-shaped strap.

9. Handle apparatus as claimed in claim 8, wherein the projection projecting into the mouth of the recess of the fastening portion is complementarily shaped corresponding to the mouth of the recess.

* * * * *